United States Patent
Manor

(10) Patent No.: US 6,662,880 B2
(45) Date of Patent: Dec. 16, 2003

(54) TRAVELING ROLLING DIGGER FOR SEQUENTIAL HOLE DRILLING AND FOR PRODUCING SEQUENTIAL CULTIVATED SPOTS IN SOIL

(76) Inventor: Gedalyahu Manor, 15 Adam Hacohan Street, Haifa 32714 (IL)

( * ) Notice: Subject to any disclaimer, the term of this patent is extended or adjusted under 35 U.S.C. 154(b) by 0 days.

(21) Appl. No.: 10/276,666
(22) PCT Filed: Jun. 8, 2001
(86) PCT No.: PCT/US01/40905
§ 371 (c)(1),
(2), (4) Date: Nov. 18, 2002
(87) PCT Pub. No.: WO01/93657
PCT Pub. Date: Dec. 13, 2001

(65) Prior Publication Data
US 2003/0116330 A1 Jun. 26, 2003

Related U.S. Application Data
(60) Provisional application No. 60/210,812, filed on Jun. 9, 2000.

(51) Int. Cl.[7] .............................................. A01B 33/02
(52) U.S. Cl. ......................... 172/48; 172/60; 172/108; 172/123; 172/125; 111/113; 175/170; 175/203
(58) Field of Search ............................ 172/48, 60, 108, 172/123, 125, 105, 106, 119, 59, 111, 110, 118, 449, 451; 37/189, 195; 111/113; 175/170, 203, 51

(56) References Cited

U.S. PATENT DOCUMENTS

| 1,506,042 A | * | 8/1924 | Bauer | 172/43 |
| 1,664,789 A | * | 4/1928 | Meyenburg | 172/60 |
| 1,773,672 A | * | 8/1930 | Grim | 172/49 |
| 2,394,771 A | * | 2/1946 | Hill | 172/32 |

(List continued on next page.)

FOREIGN PATENT DOCUMENTS

WO   WO 00/22911   4/2000

*Primary Examiner*—Victor Batson
(74) *Attorney, Agent, or Firm*—Frishauf, Holtz, Goodman & Chick, P.C.

(57) ABSTRACT

A traveling rolling digger for sequential hole drilling or for producing sequential cultivated spots in soil. The traveling rolling digger includes at least one drilling shaft which is rotatable by a drive mechanism about a longitudinal shaft axis and has a rotating soil penetrating edge. The drilling shaft is mounted to roll about a horizontal shaft in a soil penetrating plane while the horizontal shaft moves in a direction of travel of the traveling rolling digger. The rotating drilling shaft enters the soil at an entry angle and digs into the soil while the horizontal shaft moves in the direction of travel and the drilling shaft continuously changes its angle relative to the soil from the entry angle to a vertical position. The traveling rolling digger further has at least one following soil penetrating and lifting shank, The lifting shank is mounted to roll about said horizontal shaft and has a soil penetrating end positioned to enter the soil shortly before or when said drilling shaft reaches a maximum depth at its vertical position and said lifting shank acts as a pivot to lift the drilling shaft while the traveling rolling digger moves in the direction of travel.

7 Claims, 14 Drawing Sheets

U.S. PATENT DOCUMENTS

| | | | | |
|---|---|---|---|---|
| 2,493,261 A | * | 1/1950 | Porter et al. | 173/40 |
| 2,619,891 A | * | 12/1952 | Sloper | 172/92 |
| 2,890,860 A | * | 6/1959 | Smith | 173/140 |
| 3,108,645 A | * | 10/1963 | Hill | 175/108 |
| 3,367,425 A | * | 2/1968 | Heeren | 172/59 |
| 3,616,862 A | * | 11/1971 | Van Der Lely | 172/107 |
| 4,044,839 A | * | 8/1977 | van der Lely | 172/49.5 |
| 4,051,903 A | * | 10/1977 | van der Lely | 172/47 |
| 4,057,110 A | * | 11/1977 | van der Lely | 172/49.5 |
| 4,162,102 A | * | 7/1979 | Rooymans | 299/10 |
| 4,224,997 A | * | 9/1980 | van der Lely | 172/59 |
| 4,224,999 A | * | 9/1980 | van der Lely | 172/59 |
| 4,732,227 A | | 3/1988 | Wolf et al. | |
| 4,775,013 A | * | 10/1988 | van der Lely | 172/57 |
| 5,054,559 A | * | 10/1991 | Paul | 172/59 |
| 5,082,063 A | * | 1/1992 | Sidders | 172/57 |
| 5,667,019 A | * | 9/1997 | Reincke | 172/49.5 |
| 6,102,130 A | * | 8/2000 | Heckendorf | 172/111 |
| 6,161,625 A | * | 12/2000 | Mati | 172/96 |
| 6,164,384 A | * | 12/2000 | Manor | 172/1 |

* cited by examiner

TRAVELING ROLLING DIGGER FOR SEQUENTIAL HOLE DRILLING AND FOR PRODUCING SEQUENTIAL CULTIVATED SPOTS IN SOIL

This application claims the benefit of provisional application No. 60/210,812 filed Jun. 9, 2000.

BACKGROUND OF THE INVENTION

The invention relates to a digger for producing a row of spaced relatively shallow cultivated spots and to the digger adapted to drill a row of spaced—apart relatively shallow holes in the soil. Each spot or hole is produced sequentially by the digger without stopping the forward motion of the equipment while each spot or hole is being produced. The present invention thus provides a compact machine for producing a plurality of spaced cultivated spots or holes in a cost effective manner.

U.S. Pat. No. 4,732,227 discloses machines which produce a row of equidistant hole without stopping the forward motion of the equipment.

U.S. Pat. No. 6,164,384 discloses an apparatus for producing a plurality of space apart cultivated spots in soil. The spots are produced without stopping the forward motion of the equipment. U.S. Pat. Nos. 4,732,227 and 6,164,384 are hereby incorporated by this reference.

The holes and the spots which are produced using the afore described equipment have a considerably inclined wall from the maximum depth forward in the direction of forward motion.

It is an object of the present invention to improve the shape of the holes and spots which are produced by the digger without stopping the forward motion.

SUMMARY OF THE INVENTION

The invention provides a traveling rolling digger for sequential hold drilling and for producing sequential cultivated spots in soil. The traveling rolling digger has at least one drilling shaft which is rotated by a drive mechanism about the longitudinal shaft axis and has a rotating soil penetrating edge. Said at least one drilling shaft is mounted to roll about a horizontal shaft in a soil penetrating plane while said horizontal shaft moves in the direction of travel of the traveling rolling digger. Said at least one rotating drilling shaft enters the soil at an entry angle and digs into the soil while the horizontal shaft moves in the direction of travel and said drilling shaft continuously changes its angle relative to the soil from the entry angle to a vertical position. Said drilling shaft has at least one following soil penetrating and lifting shank which is mounted to roll about said horizontal shaft. Said shank is positioned to enter the soil after entry of said drilling shaft and shortly before or when said drilling shaft reaches the maximum depth at its vertical position and acts as a pivot to lift the drilling shaft while the traveling rolling digger moves in the direction of travel. The horizontal shaft is mounted on a support structure which is adapted to be connected to or mounted on a self propelled vehicle.

The following soil penetrating and lifting shank has a soil penetrating end which is preferably a chisel blade with its edge positioned in said soil penetrating plane or is a spear head.

said horizontal shaft being mounted on a support structure which is adapted to be connected to or mounted on a self propelled vehicle.

Said at least one lifting shank has a shoulder member mounted transversely on said lifting shank a distance from said penetrating edge which is substantially equal to the distance said lifting shank end penetrates into the soil. The shoulder member may be curved in a direction to the horizontal shaft. Said shoulder member acts to stop further soil penetration by said lifting shank and to function as a pivot surface to pivotally lift said drilling shaft.

The shoulder member extends radially outward from said lifting shank to provide a surface substantially transverse to the soil penetrating direction of sufficient area to substantially stop further soil penetration.

The traveling rolling digger further comprising at least one leading soil penetrating shank having a soil penetrating end. The at least one lending soil penetrating shank is mounted to roll about the horizontal shaft with its soil penetrating end rolling in a same soil penetrating plane as the at least one drilling shaft rolls in or in a soil penetrating plane parallel thereto, the at least one soil penetrating shank being of a sufficient length so that it penetrates the soil before the penetrating edge of the at least one drilling shaft penetrates the soil.

The drilling shaft of the traveling rolling digger is rotatably connected to a transmission head to rotate about the longitudinal axis of the drilling shaft. The transmission head is connected to a power unit which provides power to rotate the drilling shaft about its longitudinal axis and the power unit is connected to the drilling shaft through the transmission head.

The drilling shaft may be a digging auger having at least one helical blade ending in cutting lips or a spot cultivator which comprising at least one tilling shaft and at least one tilling element extending from the tilling shaft and rotating with the tilling shaft.

In another embodiment a downwardly extending cultivator member is rigidly connected to the at least one tilling shaft and is spaced from said shaft and rotates therewith. This downwardly extending cultivator member is of a sufficient length so that when said tilling shaft reaches a maximum penetration of the soil, the downwardly extending cultivator member penetrates into the soil and forms a depression in the soil surrounding the cultivated spot and a mound in its center as it rotates with said tilling shaft.

DETAILED DESCRIPTION OF THE INVENTION

Figure 1:
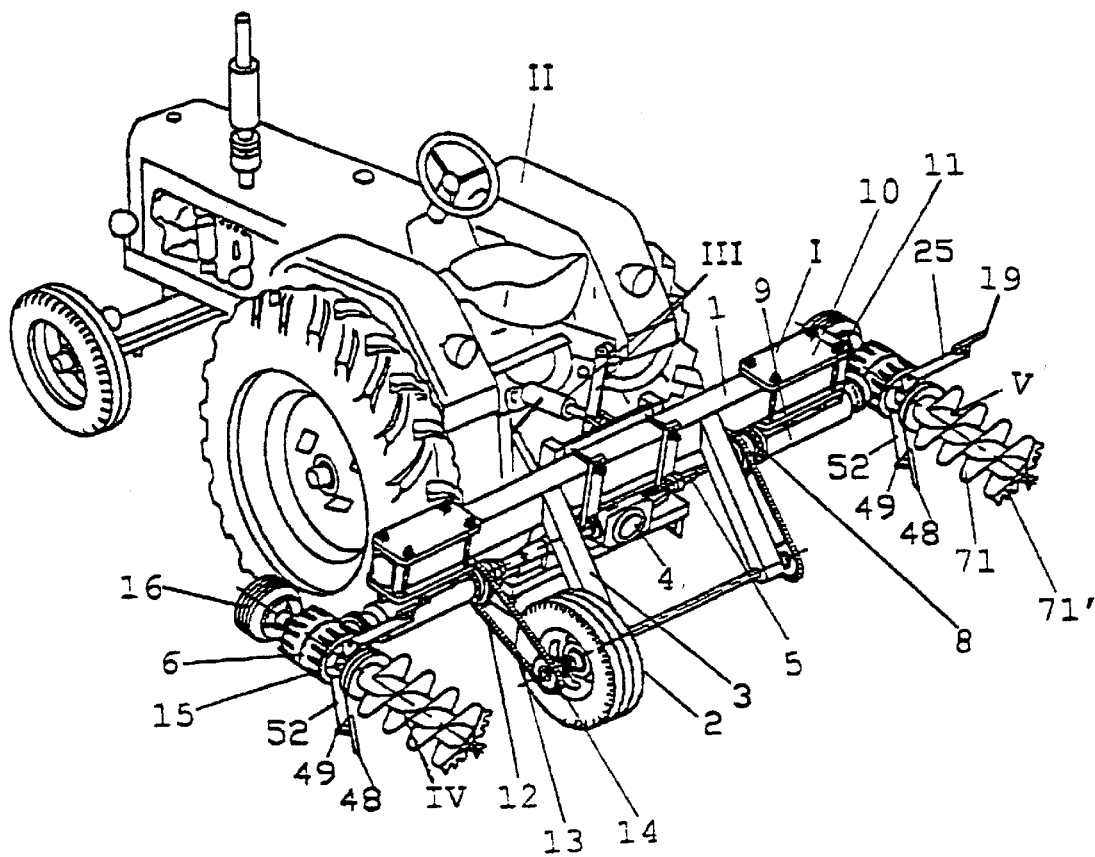
FIG. 1 is a perspective view of a traveling rolling digger for continuous holes drilling which can simultaneously drill two rows of clean holes attached to the rear of a tractor. The tilling system IV and V illustrate leading shanks 25 with the soil penetrative spearhead 19 (see FIGS. 5A and 5B) at their ends thereof and following lifting shanks 52.

FIG. 1 illustrates a traveling rolling digger I for digging two rows of holes which is attached through a hitch system III to a tractor II. The traveling rolling digger I supports a rotating horizontal shaft 5 positioned inside shaft 8 which is in housing 9. The horizontal shafts 5 and 8 are mounted on beam 1 by mounting plates 10 which are connected by bolts 11. Power is obtained from the tractor II through main power transmission gear 4 which is connected to rotating shaft 5 which transmit power to the rolling transmission head 6 which has a protruding shaft 15 which is connected to the digging auger 71 with a helical blade 7' with a helical blade ending with a pair of cutting lips 71'. The leading shank 25, with its soil penetrating edge, penetrates the soil ahead of the digging auger. The following lifting shank 52, with its penetrating edge 48 and its shoulder 49, acts as a pivot to lift the digging auger 71 to leave a clean hole. The rolling transmission head 6 has a counterweight 16 axially mounted with the digging auger 71. The illustrated tractor II is a four-wheel tractor. Other self-propelled prime movers could be used in place of the four-wheel tractor such as a track vehicle or a combination wheel and track vehicle. The rolling action is powered by a wheel 2 and chain transmission 12, 13 and 14.

Figure 2A:
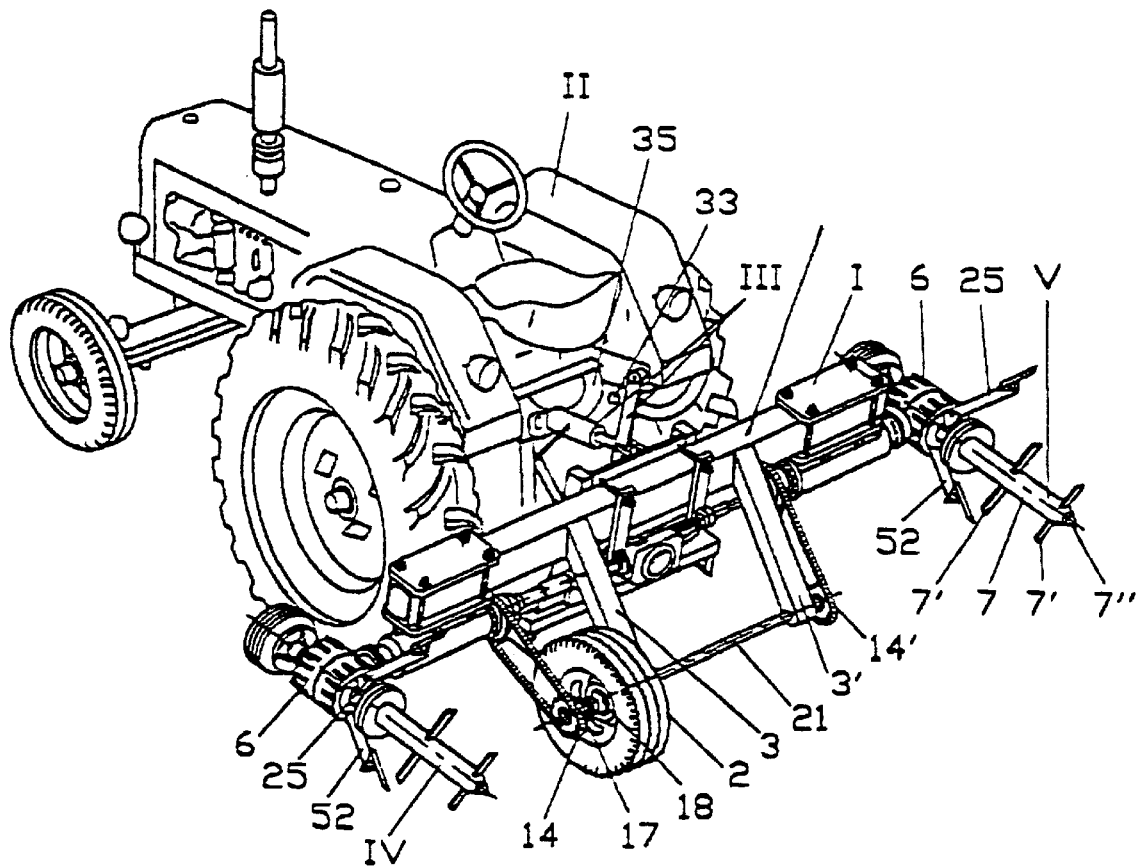
FIG. 2A is a perspective view of the traveling rolling digger for continuous producing cultivated spots in soil which can simultaneously cultivate two rows of spots attached to the rear of a tractor.
Figure 2B:
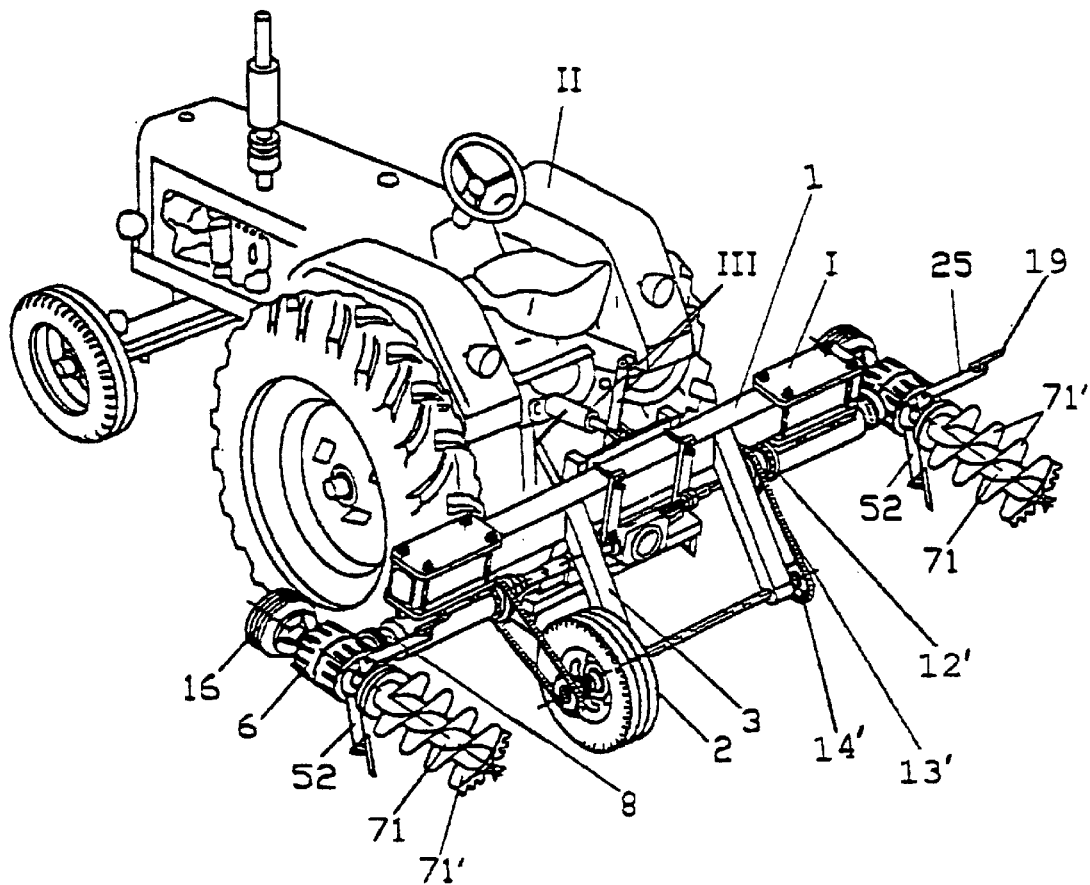
FIG. 2B is a perspective view of a traveling rolling digger for continuous holes drilling which can simultaneously drill two rows of clean holes attached to the rear of a tractor.

FIGS. 2A and 2B illustrate an embodiments wherein the traveling rolling digger 71 [spot cultivator 7] simultaneously cultivates two rows of spots (FIG. 2A) or two rows of holes (FIG. 2B) One row of spots is cultivated by the tilling system IV and the other row of spots is cultivated by the tilling system V which are mounted at opposite ends of the main beam 1. This embodiment also illustrates the use of the rolling wheel 2 to power the forward rotary motion of the transmission heads 6 through a transmission chain 13, 13' connecting sprockets 14, 14' and 12, 12' which rotate the horizontal rotary shafts 8, 8' which in turn provide forward rolling motion to the transmission heads 6. The rolling wheel structure and associated chain transmissions are supported by the wheel structure 3 and 3' with power being transmitted from the rolling wheel 2 to a sprocket 14' by shaft 21. In FIG. 2A, sprockets 14, 14' are connected to the wheel 2 through clutch 17 and a brake 18. In FIGS. 2A and 2B the tilling systems VI and V illustrate a leading shank 25 with the soil penetrative spearhead 19 (see FIGS. 5A and 5B) at the end thereof and following lifting shanks 52.

Figure 3A:
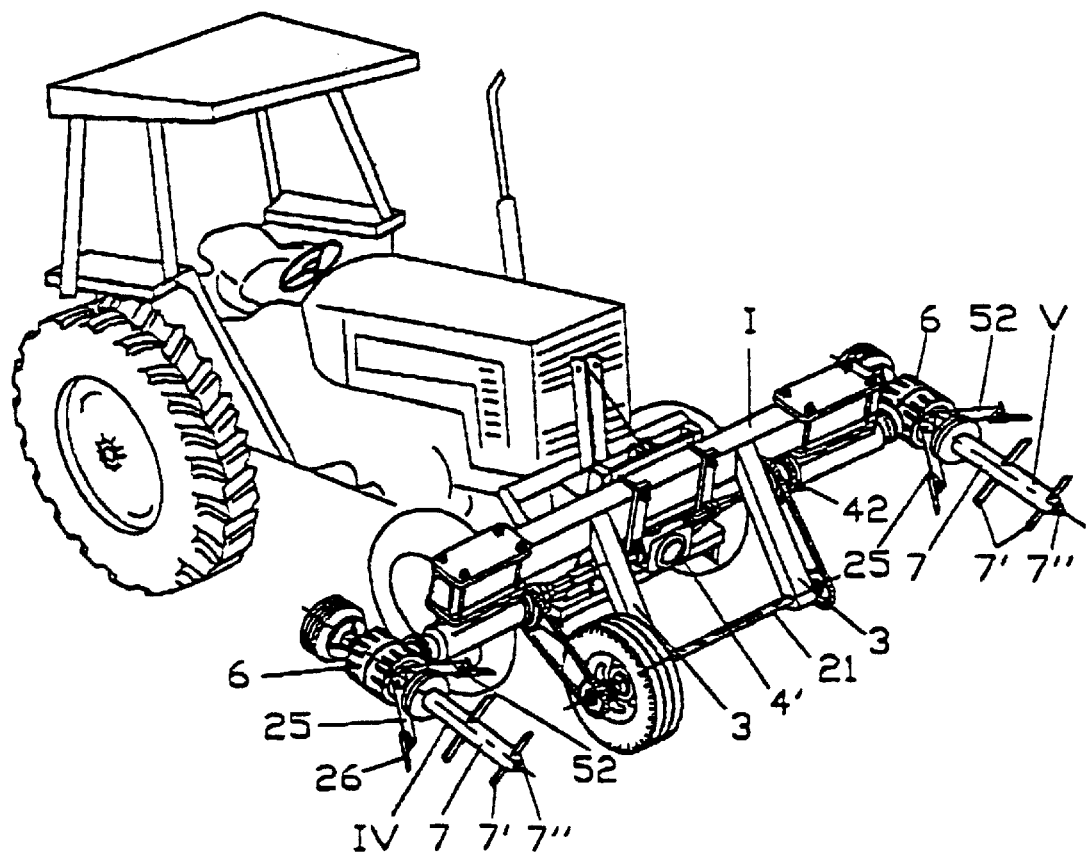
FIG. 3A is a perspective view of the traveling rolling digger of FIG. 2A attached to the front of a tractor.
Figure 3B:
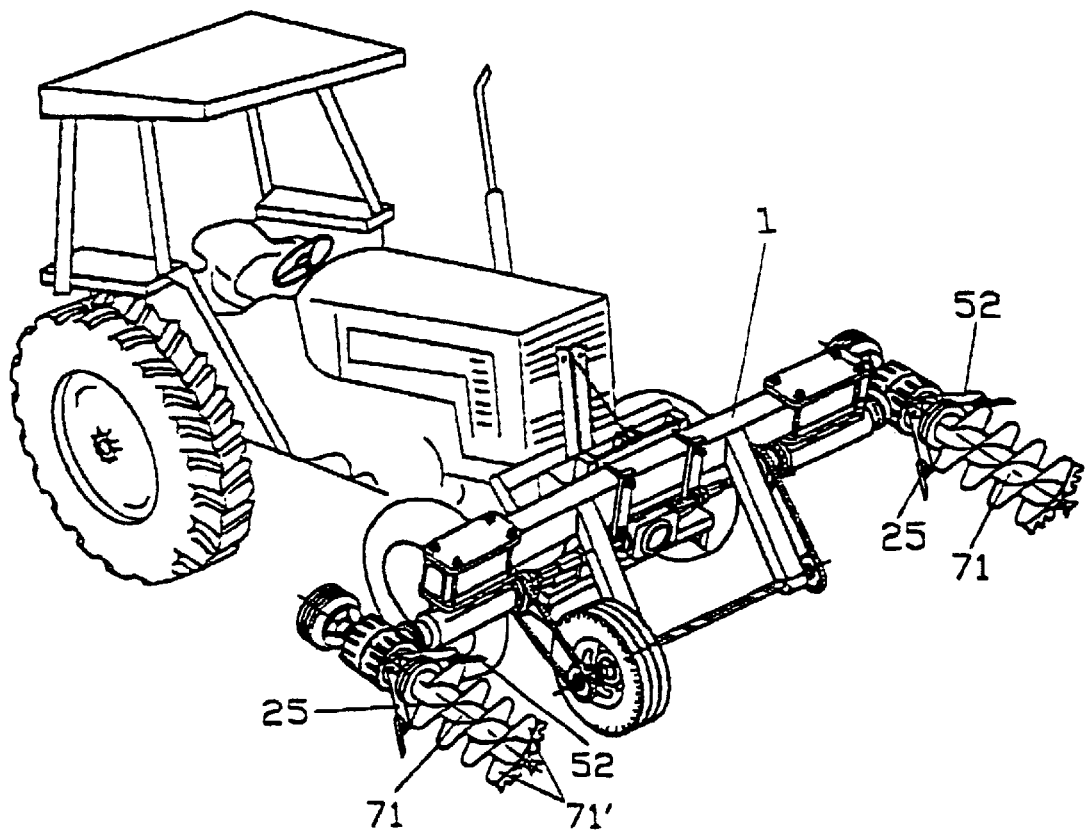
FIG. 3B is a perspective view of the traveling rolling digger of FIG. 2B attached to the front of a tractor.

FIGS. 3A and 3B illustrate the embodiments generally similar to that of FIGS. 2A and 2B except that the main structure beam 1 is mounted at the front of the tractor and the tilling shaft has four blades 7' in two levels.

Figure 4A:
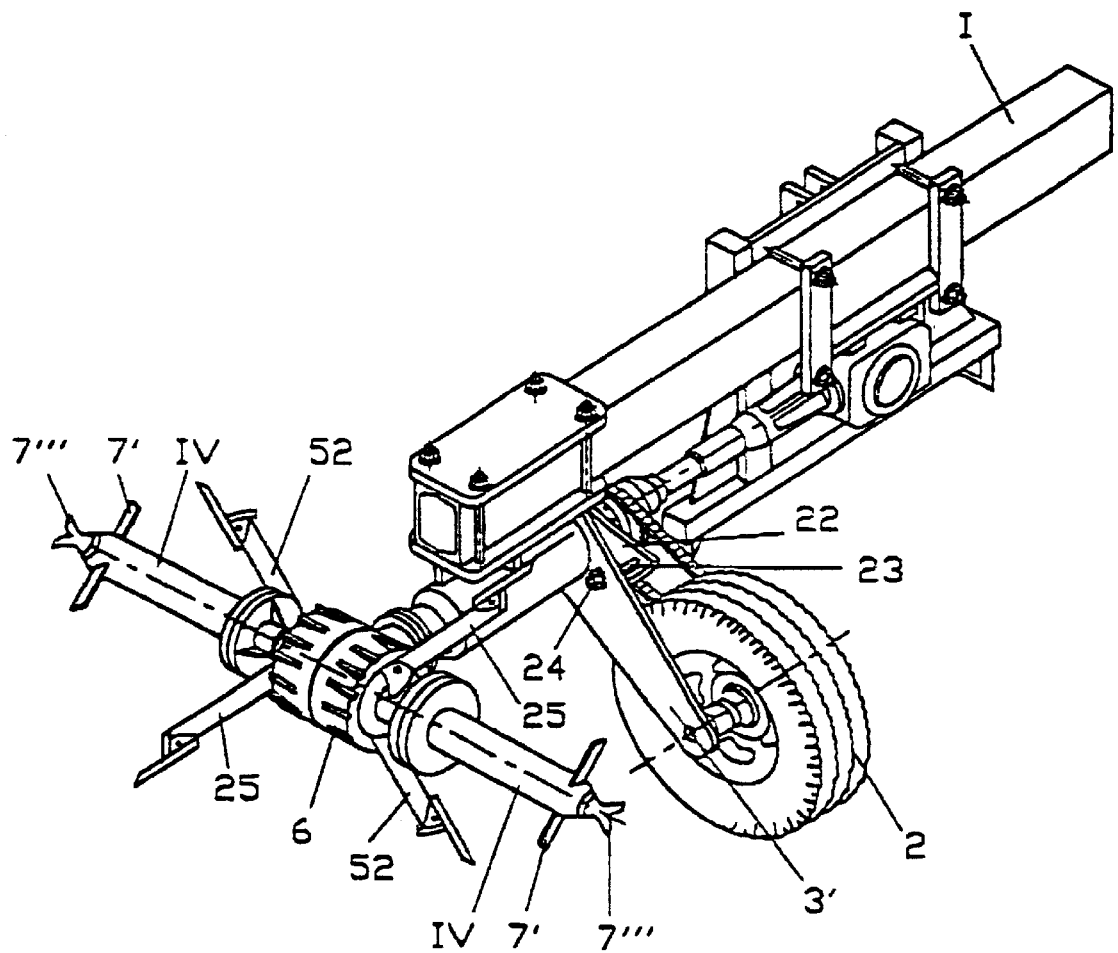
FIG. 4A is a perspective view of a traveling rolling digger for continuous producing cultivated spots with two drilling shafts in the same forward moving plane.
Figure 4B:
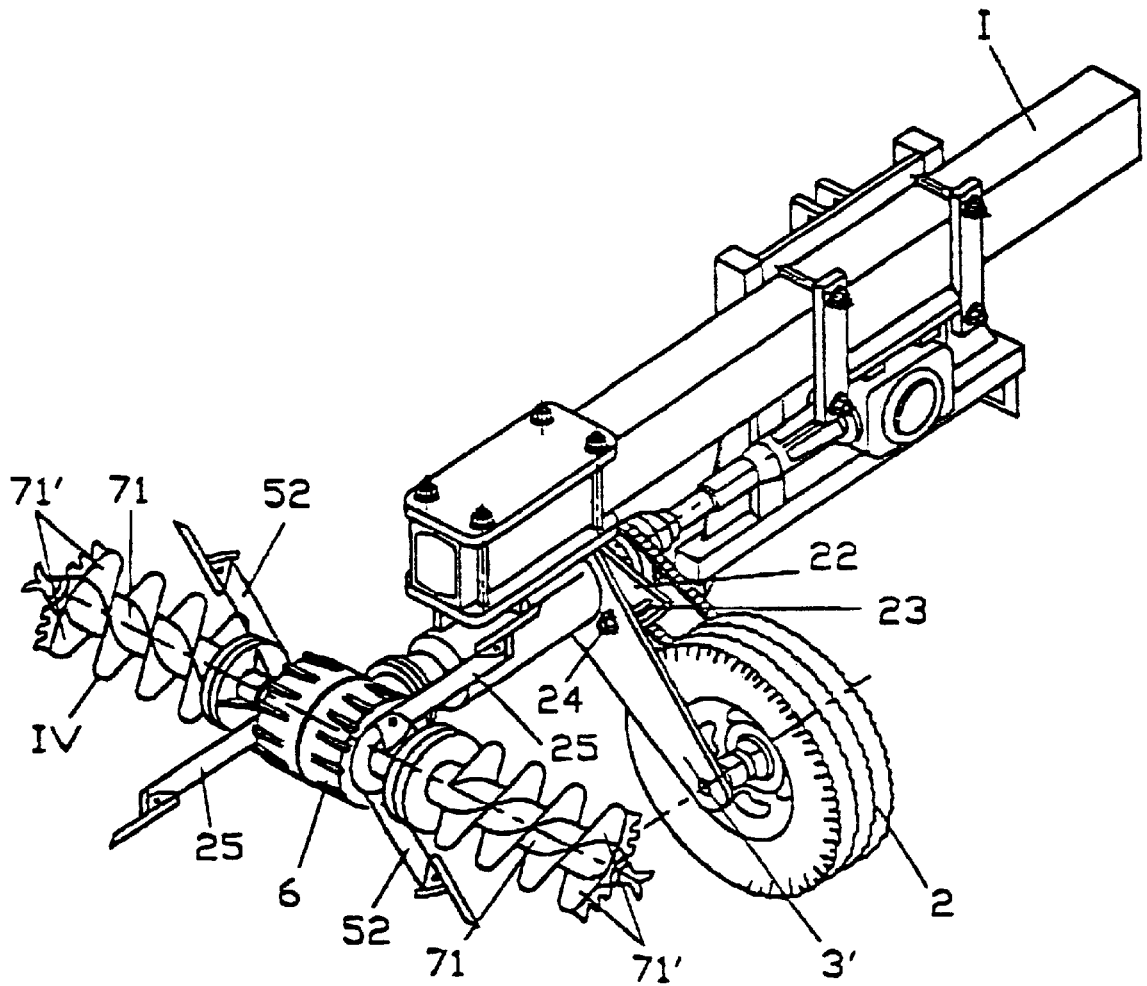
FIG. 4B is a perspective view of a traveling rolling digger for continuous holes drilling with two drilling shafts in the same forward moving plane.

FIGS. 4A and 4B illustrate embodiments wherein there are two revolving and rolling drilling systems IV supported by and powered by one transmission head 6. This embodiment provides the advantage that two cultivated spots or holes are sequentially formed by tilling during a single rotation of the head 6 (FIG. 4A) and two holes are drilled (FIG. 4B).

Figure 5A:
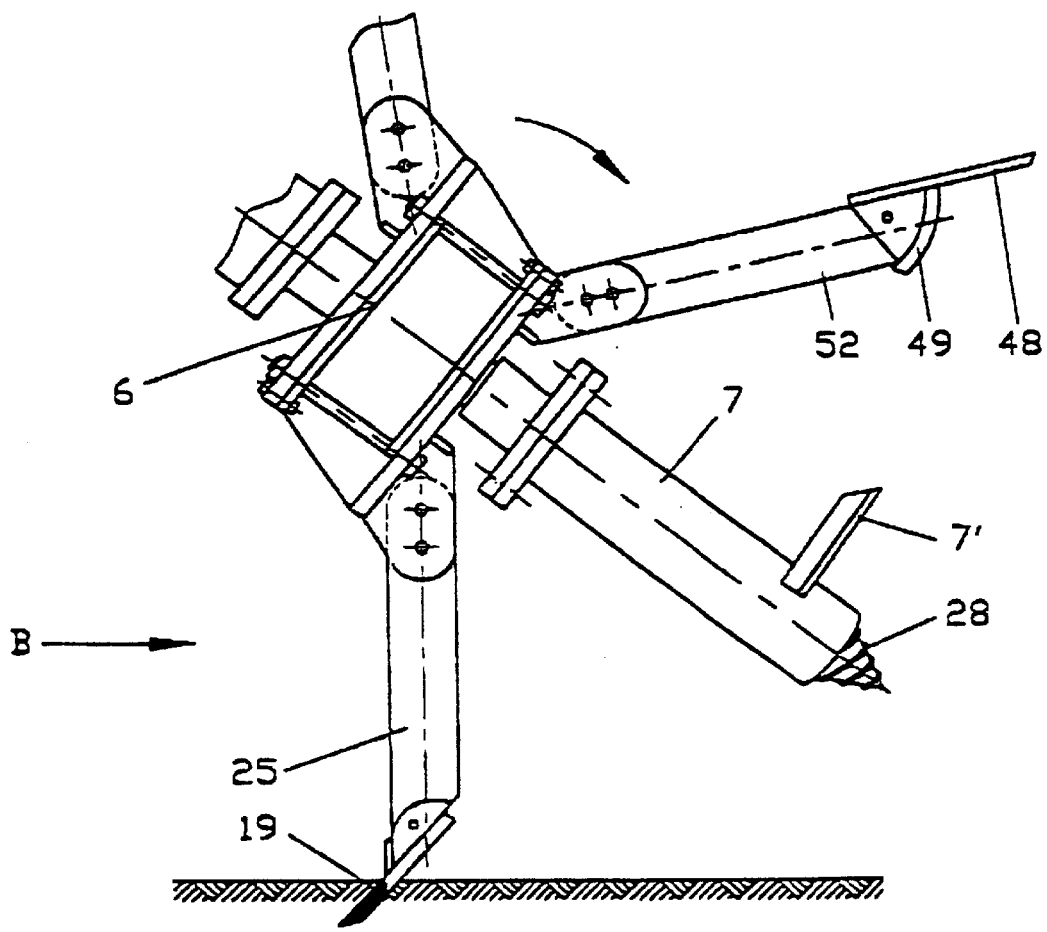
FIG. 5A is a side view of a traveling rolling digger with a spearhead on an end of a soil penetrating shank and with a following soil penetrating shank.

FIG. 5A schematically illustrates an embodiment wherein the leading soil penetrating shank 25 with the chisel end 26 penetrating the soil and the tilling shaft 7 has a fish tail edge 7" and a following lifting shank 52, with its edge 48 and a shoulder member 49 behind the tilling shaft 7.

Figure 5B:
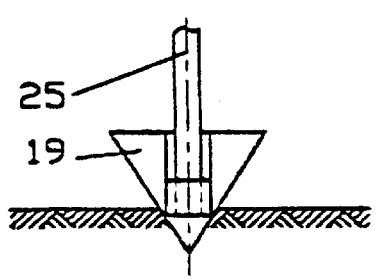
FIG. 5B is a sectional rear view along arrow B in FIG. 5A.

FIG. 5B illustrates the rear view of the chisel head 26 attached to the shank 25.

Figure 6:
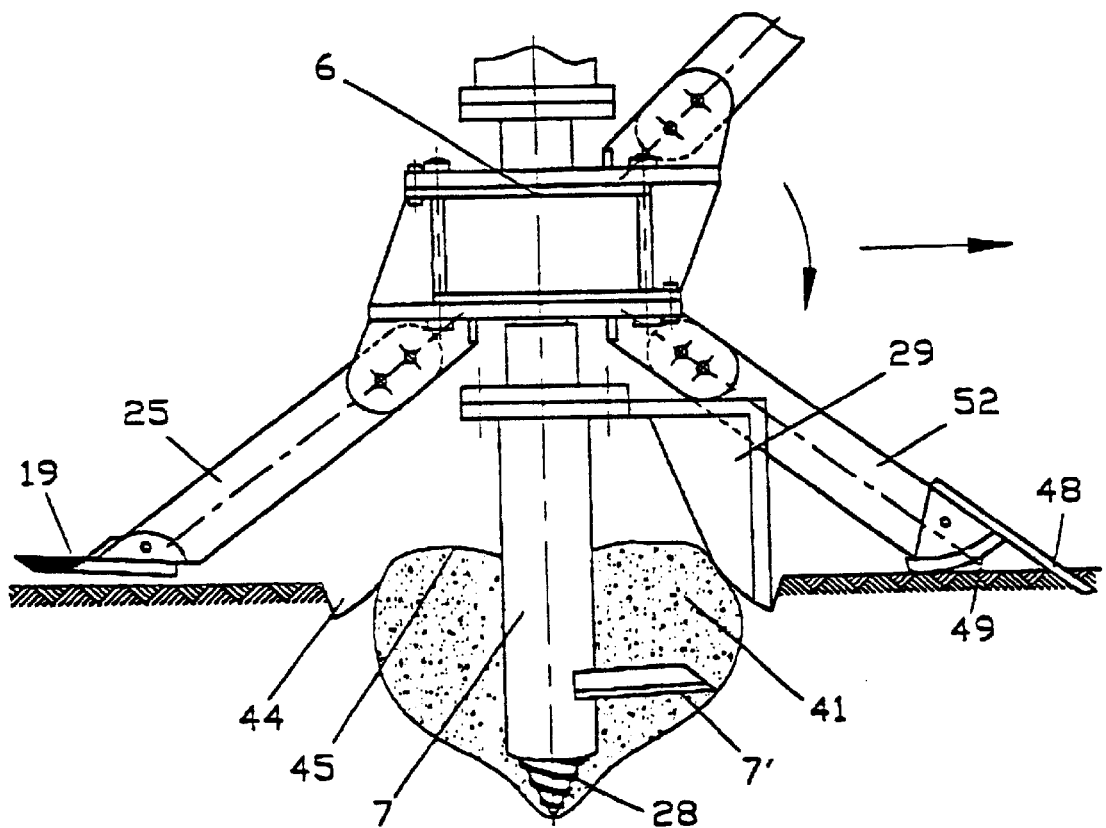
FIG. 6 is side view of the traveling rolling digger having a spot cultivator, a side mounted vertical cultivator and two shanks together with a cross-section of the tilled cultivated spot in a position when a drilling shaft reaches a maximum depth at its vertical position and the following lifting shaft pushed the soil surface acting as a pivot for a transmission head.

FIG. 6 illustrates the tilling shaft 7 with a side mounted vertical cultivator 29 in its vertical position and the following lifting shank 52 touching the soil surface with its edge 48 and a shoulder member 49. The depth of penetration below the original soil line may be as deep as 0.8 meter or even deeper if desired.

Figure 7A:
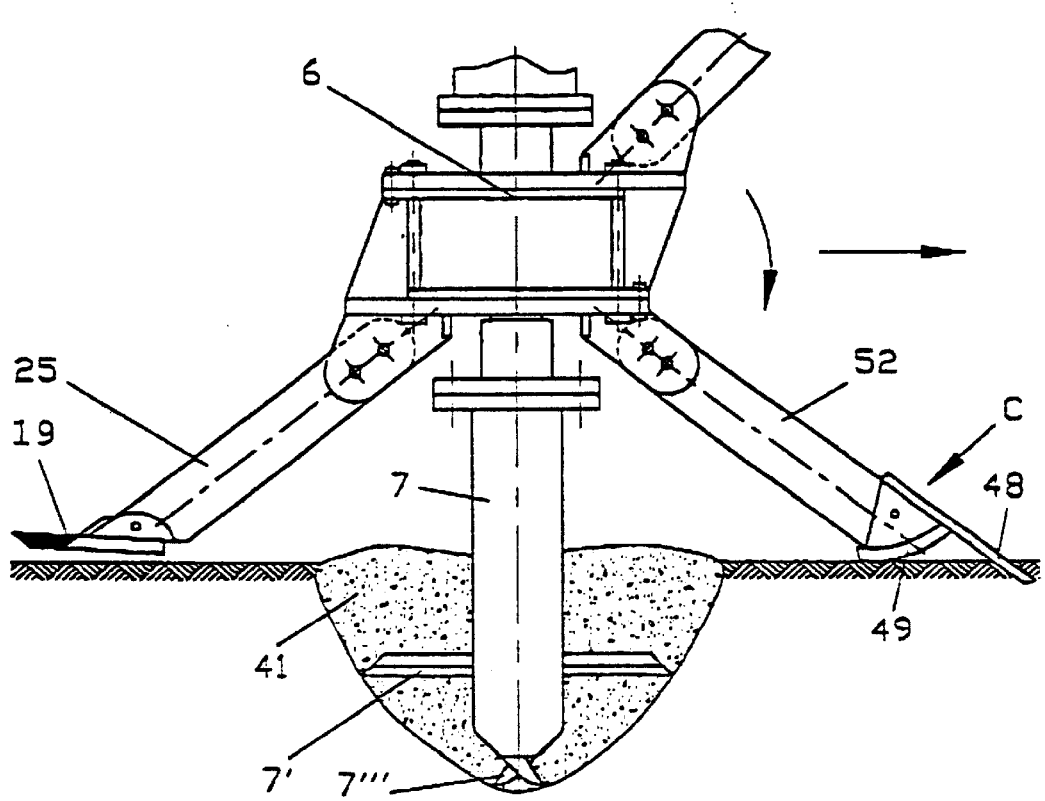
FIG. 7A illustrates the continuous movement of the transmission head with the drilling shaft and with the following lifting shank and the leading soil penetrating shank in a position when a drilling shaft reaches a maximum depth at its vertical position and the following lifting shaft pushed the soil surface acting as a pivot for a transmission head.

FIG. 7A is analogous to FIG. 6 except that the tilling shaft 7 hasn't vertical cultivator.

Figure 7B:
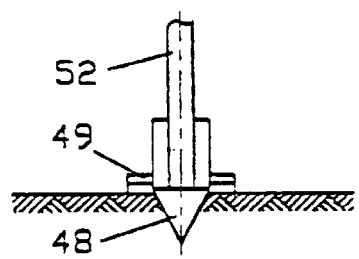
FIG. 7B is a sectional rear view along arrow C in FIG. 7A.

FIG. 7B illustrates the back view of the chisel head 48 with the shoulder member 49 attached to the following lifting shank 52 as a preferred embodiment of the lifting shaft.

Figure 8:
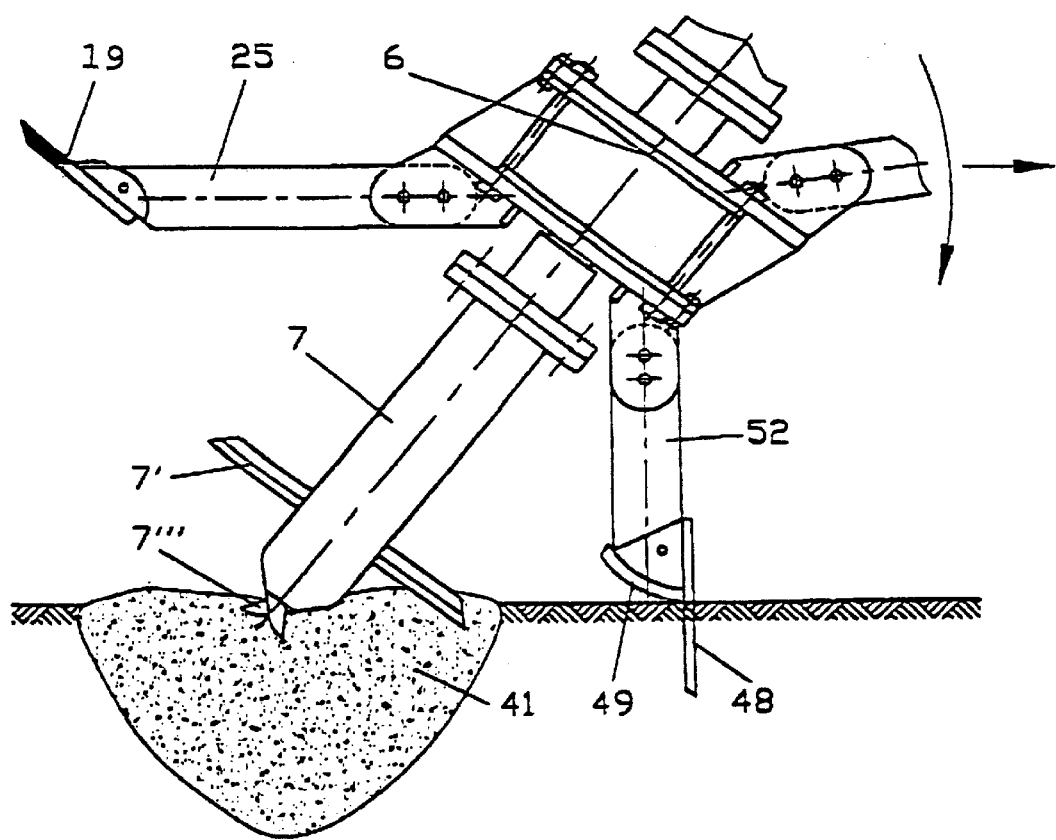
FIG. 8 illustrates the same movement of the transmittal head as in FIG. 7A in position when the drilling shaft exiting the cultivated spot after being lifted around the edge of the lifting following shank acting as a pivot for transmission head and the drilling shaft.

FIG. 8 illustrates the movement of the tilling shaft 7 and the head 6 after the tilling shaft 7 was in its vertical position when the following lifting shaft 52 with its edge 48 and shoulder member 49 acting as a pivot for the transmission head 6 and the tilling shaft 7 to exist the cultivating spot 41. The tilling shaft 7 exiting the cultivated spot 41, while moving forward, after being lifted around the support member 49 of the following shank 52 acting as the pivot. The soil in the cultivated spot 41 remains with minimum disturbance because of the almost substantially vertical lift of the tilling shaft 7.

Figure 9:
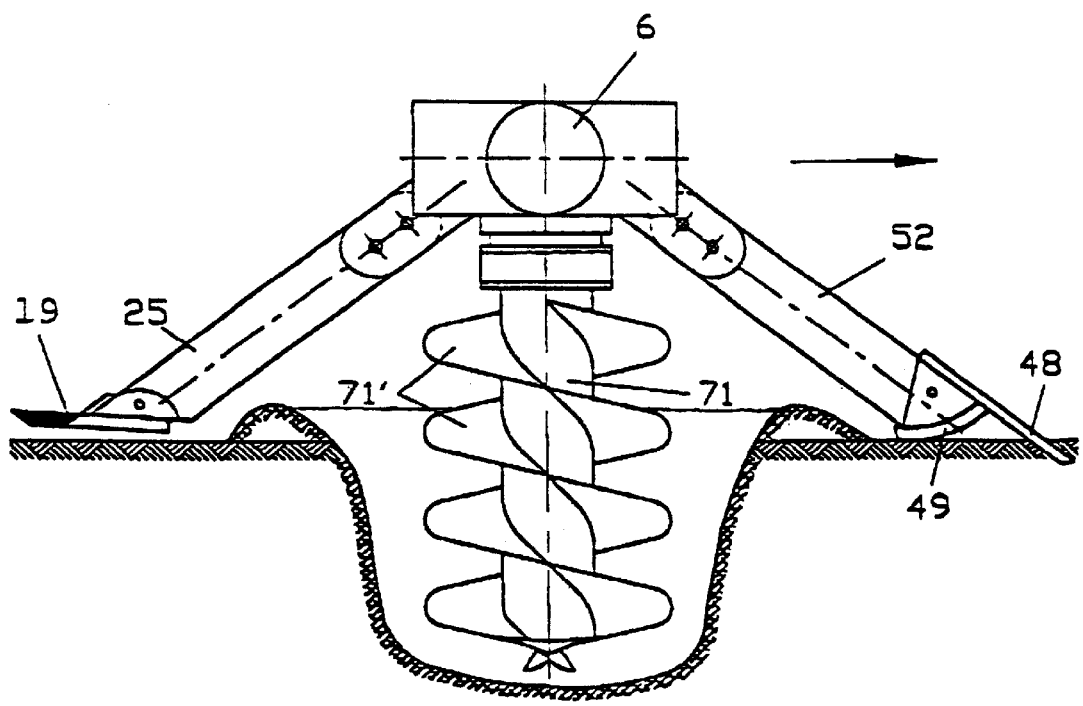
FIG. 9 illustrates the continuous movement of the transmission head with the drilling shaft as a digging auger and with the following lifting shank and the leading soil penetrating shank in a position when a drilling auger reaches a maximum depth at its vertical position and the following lifting shaft pushed the soil surface acting as a pivot for a transmission head.

FIG. 9 illustrate the digging auger 71 in its vertical position with the following lifting shank 52 touching the soil surface with its edge 49.

Figure 10:
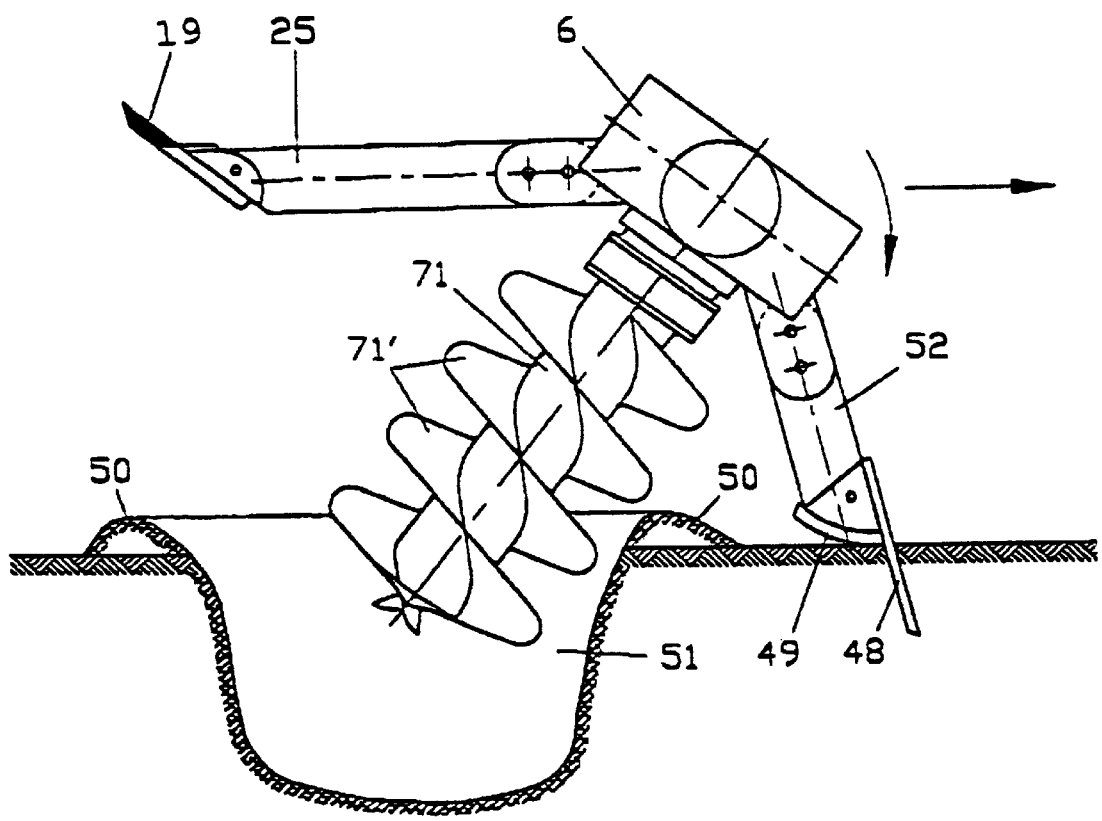
FIG. 10 illustrates the same movement of the transmittal head as in FIG. 9 in position when the drilling auger is exiting the cultivated spot after being lifted around the edge of the following lifting shank acting as a pivot for transmission head and the drilling shaft.

FIG. 10 illustrates the movement of the digging auger 71 and the head 6 after the digging auger 71 was in its vertical position when the following lifting shaft 52 with its edge 48 and shoulder member 49 acting as a pivot for the transmission head 6 and the digging auger 71 to exit the hole 51. The digging auger 71 is exiting the hole 51, while moving forward, after being lifted around the support member 49 of the following lifting shank 52 acting as the pivot. The soil 50 dug out of the hole 51 is thrown from the digging auger 71 and remains around the hole 51. The cross section of the hole 51 has substantially vertical walls because of the almost substantially vertical lift of the auger 71.

Figure 11:
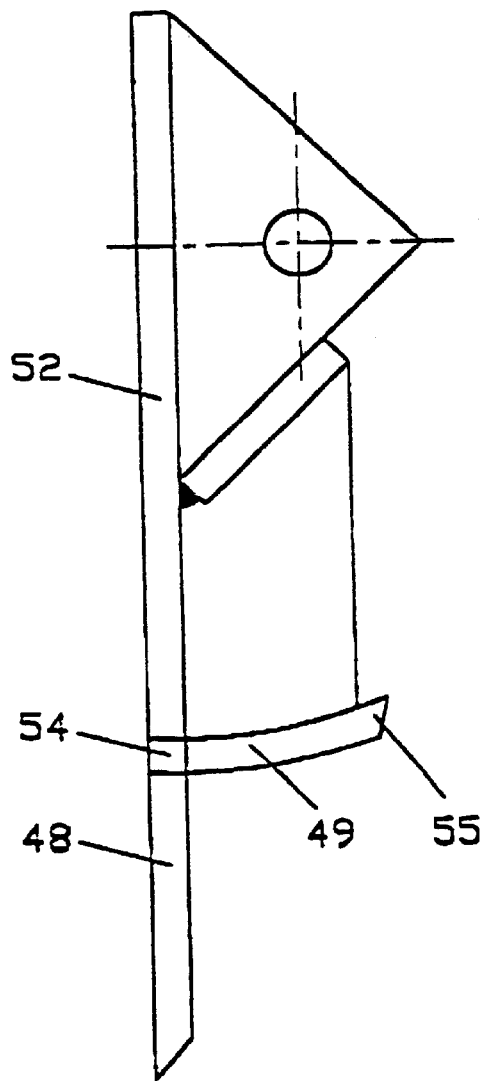
FIG. 11 illustrates a side view of the chisel mounted on the edge of the following lifting shank.

FIG. 11 illustrates a side view of the chisel mounted on the edge of the following lifting shank 52. The pointed spear head 48 of the chisel penetrates the soil easy and the shoulder member 49 has two sides 54 and 55, one side 54 of the shoulder member 49 is connected to the chisel 48 and is substantially perpendicular to the lifting shank 52 and another side 55 of the shoulder member is curved on a direction of the horizontal shaft 5. The shoulder member 49 maintains a support for the lifting shank 52 on the soil surface as a pivot to lift the digger substantially vertically.

Figure 12:
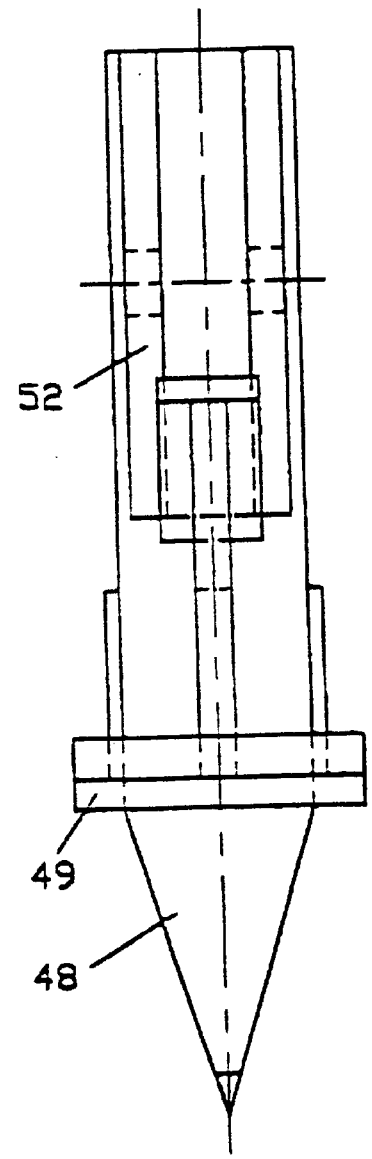
FIG. 12 illustrates a rear view of the chisel mounted on the edge of the following lifting shank.

FIG. 12 illustrates a rear view of the chisel mounted on the edge of the following shank 52.

What is claimed is:

1. A traveling rolling digger for sequential hole drilling or for producing sequential cultivated spots in soil, the traveling rolling digger comprising:

at least one drilling shaft which is rotatable by a drive mechanism about a longitudinal shaft axis and having a rotating soil penetrating edge;

said at least one drilling shaft being mounted to roll about a horizontal shaft in a soil penetrating plane while said horizontal shaft moves in a direction of travel of the traveling rolling digger, whereby said at least one rotating drilling shaft enters the soil at an entry angle and digs into the soil while the horizontal shaft moves in said direction of travel and the drilling shaft continuously changes its angle relative to the soil from the entry angle to a vertical position; and at least one following soil penetrating and lifting shank, said lifting shank being mounted to roll about said horizontal shaft, said lifting shank having a soil penetrating edge positioned to enter the soil shortly before or when said drilling shaft reaches a maximum depth at its vertical position and said lifting shank acts as a pivot to lift the drilling shaft while the traveling rolling digger moves in said direction of travel; and said horizontal shaft being mounted on a support structure which is adapted to be connected to or mounted on a self propelled vehicle.

2. The traveling rolling digger of claim 1, wherein said at least one lifting shank has a shoulder member mounted transversely on said lifting shank a distance from said penetrating edge which is substantially equal to the distance said lifting shank end penetrates into the soil whereby said shoulder acts to stop further soil penetration by said lifting shank and to function as a pivot surface to pivotally lift said drilling shaft.

3. The traveling rolling digger of claim 2, wherein said shoulder member extends radially outward from said lifting shank to provide a surface substantially transverse to the soil penetrating direction of sufficient area to substantially stop further soil penetration.

4. The traveling rolling digger of claim 3, further comprising at least one leading soil penetrating shank having a soil penetrating end, said at least one leading soil penetrating shank being mounted to roll about said horizontal shaft with its soil penetrating end rolling in a same soil penetrating plane as said at least one drilling shaft rolls in or in a soil penetrating plane parallel thereto, said at least one soil penetrating shank being of a sufficient length so that it penetrates the soil before the penetrating edge of said at least one drilling shaft penetrates the soil.

5. The traveling rolling digger of claim 1, wherein said at least one drilling shaft is rotatably connected to a transmission head to rotate about the longitudinal axis of said at least one drilling shaft, said transmission head being connected to a power unit which provides power to rotate the at least one drilling shaft about its longitudinal axis, said power unit being connected to the at least one drilling shaft through said transmission head.

6. The traveling rolling digger of claim 5, wherein said at least one drilling shaft is a digging auger, said auger comprising at least one helical blade ending in cutting lips.

7. The traveling rolling digger of claim 5, wherein said at least one drilling shaft is a spot cultivator, said spot cultivator comprising at least one tilling shaft and at least one tilling element extending from said at least one tilling shaft and rotating with said at least one tilling shaft.

* * * * *